(12) United States Patent
Okita

(10) Patent No.: US 8,736,869 B2
(45) Date of Patent: May 27, 2014

(54) LAYOUT PRINT SYSTEM, METHOD FOR VIEWING LAYOUT DOCUMENT, AND PROGRAM PRODUCT

(75) Inventor: Kunio Okita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 779 days.

(21) Appl. No.: 12/458,432

(22) Filed: Jul. 13, 2009

(65) Prior Publication Data

US 2010/0033754 A1 Feb. 11, 2010

(30) Foreign Application Priority Data

Aug. 7, 2008 (JP) .................................. 2008-204624

(51) Int. Cl.
*G06F 3/12* (2006.01)
(52) U.S. Cl.
USPC ......... 358/1.15; 358/1.18; 715/209; 715/224; 715/251
(58) Field of Classification Search
USPC ....................................................... 358/1.15
See application file for complete search history.

(56) References Cited

U.S. PATENT DOCUMENTS

| | | | | |
|---|---|---|---|---|
| 6,008,812 | A * | 12/1999 | Ueda et al. ..................... | 345/418 |
| 7,764,830 | B1 * | 7/2010 | Wnek ............................ | 382/159 |
| 2001/0011283 | A1 * | 8/2001 | Kato et al. .................... | 707/511 |
| 2005/0172225 | A1 | 8/2005 | Kobashi et al. | |
| 2007/0003166 | A1 | 1/2007 | Berkner | |
| 2007/0041051 | A1 * | 2/2007 | Tanaka .......................... | 358/1.18 |
| 2009/0070348 | A1 * | 3/2009 | Uejo .............................. | 707/100 |

FOREIGN PATENT DOCUMENTS

| | | |
|---|---|---|
| JP | 9-305655 | 11/1997 |
| JP | 2001-209655 | 8/2001 |
| JP | 2002-24909 | 1/2002 |
| JP | 2003-320726 | 11/2003 |
| JP | 2005-018399 | 1/2005 |
| JP | 2005-216180 | 8/2005 |
| JP | 2006-048532 | 2/2006 |
| JP | 2007-11801 | 1/2007 |
| JP | 2007-012074 | 1/2007 |
| JP | 2007-049387 | 2/2007 |
| JP | 2007-110505 | 4/2007 |
| JP | 2007-148486 | 6/2007 |

OTHER PUBLICATIONS

Office Action dated Sep. 25, 2012, issued in Japanese Application No. 2008-204624.

* cited by examiner

*Primary Examiner* — Vincent Rudolph
*Assistant Examiner* — Aaron R Gerger
(74) *Attorney, Agent, or Firm* — Harness, Dickey & Pierce, P.L.C.

(57) ABSTRACT

There is provided a layout print system including a storage storing electronic data sets having unique document IDs, and a printing image generating apparatus generating printing image data based on the stored electronic data sets. The printing image generating apparatus includes an acquisition section acquiring the electronic data sets, an identification section identifying a document form type for the electronic data sets, a weight value determination section determining weight values for the electronic data sets, and a printing image generating section generating a printing image data by arranging the electronic data sets on a layout template based on the weight values and attaching identification information to the electronic data sets. The layout print system further includes a printer printing the printing image data, and a display apparatus including an information identification reader reading the identification information on a printing medium and displaying a desired one of the electronic data sets.

16 Claims, 17 Drawing Sheets

| CHARACTER STRING | WEIGHT VALUE |
|---|---|
| IMPORTANT | +0.1 |
| URGENT | +0.2 |
| XX TRADING CORP. | +0.1 |
| ... | ... |

304-4

| DOCUMENT-FORM ID | x-COORDINATE AT INTERSECTION | y-COORDINATE AT INTERSECTION | WIDTH | HEIGHT | ORIGINAL DOCUMENT FORMAT |
|---|---|---|---|---|---|
| 1 | 1 | 14 | 24 | 16 | DELETE |
| 2 | 2 | 25 | 20 | 20 | DELETE |
| 4 | 15 | 5 | 10 | 25 | LEAVE |
| ... | ... | ... | ... | ... | ... |

FIG.7
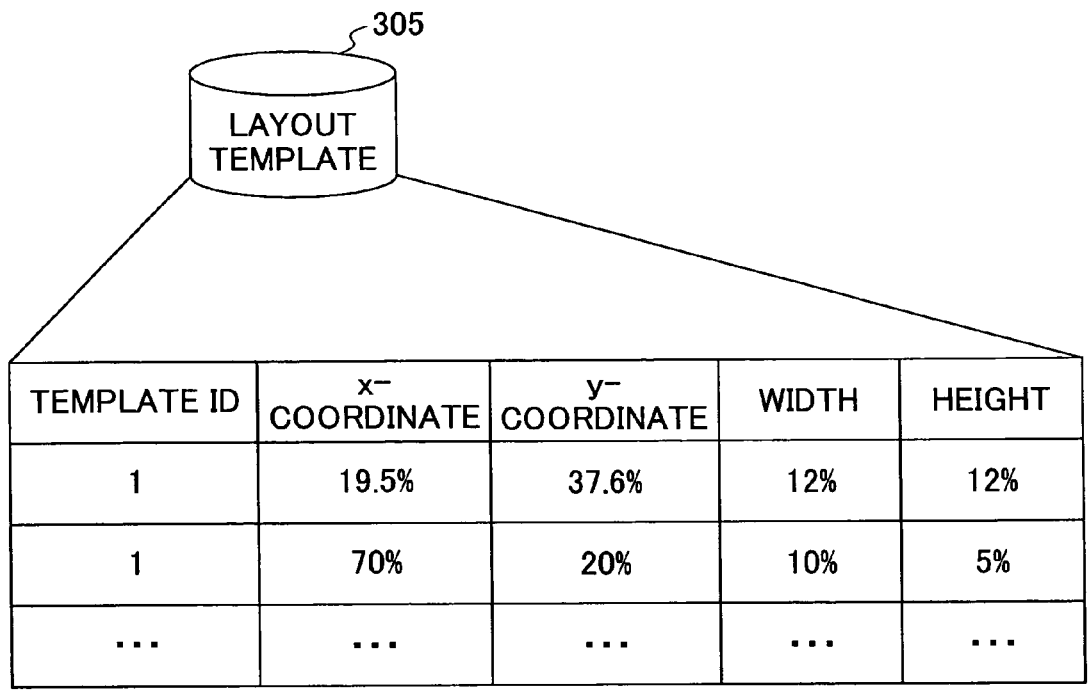
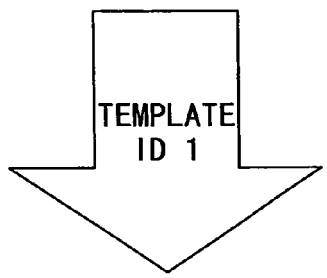
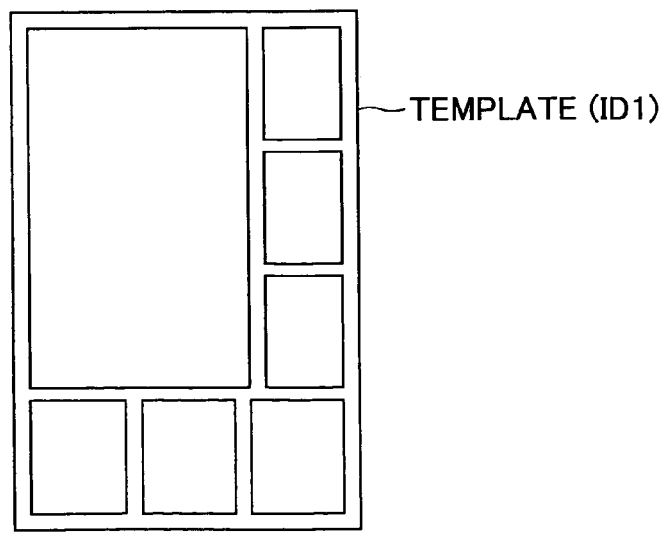

LAYOUT PRINT SYSTEM, METHOD FOR VIEWING LAYOUT DOCUMENT, AND PROGRAM PRODUCT

BACKGROUND OF THE INVENTION

1. Field of the Invention

The present invention generally relates to a layout print system, a method for viewing a layout document and a computer-readable storage medium storing a program for causing a computer to execute the method for viewing a layout document.

2. Description of the Related Art

Paper-based business documents are increasingly being replaced by electronic or digital documents in view of increased work efficiency. More digital business documents are being used in business now than before; however, there are still numerous paper-based business documents handled in clerical work processes.

The paper-based processes in clerical work are generally cumbersome. For example, the paper-based documents may be grouped and clipped together with paper clips so that the documents are kept in serial order, and not separated or lost. However, the paper-based documents filed in serial order may need shuffling numerous times to compare some pages with others. The fewer the number of pages of the paper-based documents are, the less cumbersome the clerical work processes will be, thereby increasing work efficiency. Fewer pages of the paper-based documents may also result in ecologically friendly businesses. Thus, a technology in which the paper-based documents are combined and arranged in one page or fewer than the number of pages originally received to facilitate viewing the contents of the documents is much desired for increasing work efficiency with paper-based business documents.

Japanese Laid-Open Patent Application No. 2006-48532 discloses a technology in which plurality paper-based documents are combined and arranged on one page to facilitate their viewing. With this technology, since a user determines a priority order for the arrangement of the documents, the user can adjust sizes of the documents arranged on the page based on the priority order.

Japanese Laid-Open Patent Application No. 2005-18399 discloses a technology in which multiple pages are combined and printed on one or fewer than the number of pages of the documents originally received. In this technology, portions of the documents with protruding the print regions are combined with the documents having large margins so that sizes of the documents combined and printed are adequately adjusted on one page or as few pages as possible.

However, it is still not satisfactory to streamline the handling of the paper-based documents in clerical work processes with such disclosed technologies and other similar technologies. In the technology disclosed in Japanese Laid-Open Patent Application No. 2006-48532, the documents with contents that the user thinks are important are provided with greater weight values than those given to other documents. Those documents with the greater weight values are printed with larger sizes on a printing medium, thereby exhibiting excellent viewability for the user. However, the contents of the documents with less weight values are printed too small to be seen or read, thereby disturbing the efficient clerical work processes. In addition, in this technology, the user needs to provide the weight values of the documents which also results in lowering work efficiency. In the technology disclosed in Japanese Laid-Open Patent Application No. 2005-18399, the portions of the documents with protruding print regions are combined with the documents having large margins so that the sizes of the documents combined and printed are adequately adjusted on one printing medium. However, in this technology, if the number of pages printed on the printing medium is increased, the contents of the documents are printed too small to be seen or read, thereby also disturbing the efficient clerical work processes.

That is, in either of those disclosed technologies, if the documents are combined and printed on one page or fewer than the number of pages of the documents originally received, some of the contents of the documents are too small to be seen or read. In such cases, the user has to go back to the original documents to clarify their contents, thereby drastically lowering the work efficiency.

SUMMARY OF THE INVENTION

Accordingly, embodiments of the present invention may provide a novel and useful layout print system, and a method for viewing a layout document and a program product for causing a computer program to execute the method for viewing the layout document solving one or more of the problems discussed above. More specifically, the embodiments of the present invention may provide a layout print system in which plural documents are combined and arranged in one page or fewer than the number of pages originally received, a method for viewing an original document by tracing back from the combined document layout and a program product for causing a computer to execute the method for viewing the original document by tracing back from the combined document layout.

There is provided a layout print system according to an embodiment of the invention includes a storage configured to store a plurality of electronic data sets having unique document IDs attached thereto, a printing image generating apparatus configured to generate printing image data based on the stored electronic data sets. The printing image generating apparatus includes an acquisition section configured to acquire the plural electronic data sets with the unique document IDs attached thereto from the storage, an identification section configured to identify a type of a document form for each of the plural electronic data sets acquired by the acquisition section, a weight value determination section configured to determine a weight value for each of the plural electronic data sets based on the identified type of the document form identified by the identification section, and a printing image generating section configured to generate the printing image data by arranging the plural electronic data sets on a layout template having a plurality of layout regions based on the weight value for each of the plural electronic data sets determined by the weight value determination section and attaching identification information to the plural electronic data sets arranged on the layout template. The layout print system further includes a printer configured to print the printing image data generated by the printing image generating section, and a display apparatus including an information identification reader provided thereto to read the identification information printed on a printing medium, and configured to display a desired one of the electronic data sets by carrying out identification processing based on the identification information.

In addition, there is provided a method for viewing a layout document in the layout system according to an embodiment of the invention having a storage to store electronic data sets having unique document IDs attached, a printing image generating apparatus to generate print image data based on the electronic data sets, a printer to print the printing image data, and a display apparatus to display the electronic data sets. The method includes acquiring plural of the electronic data sets having unique document IDs, identifying a type of a document form for each of the acquired electronic data sets, determining a weight value for each of the acquired electronic data sets based on the identified type of the document form, generating printing image data by arranging the electronic data sets on a layout template having plural layout regions based on the weight value for each of the electronic data sets and attaching identification information corresponding to the unique document IDs to the electronic data sets arranged on the layout template, and displaying one of the electronic data sets retrieved from the storage corresponding to the identification information obtained by reading the identification information printed on a printing medium.

There is also provided a method for viewing a layout document in the layout system according to an embodiment of the invention having a storage to store electronic data sets having unique document IDs attached, a printing image generating apparatus to generate print image data based on the electronic data sets, a printer to print the printing image data, and a display apparatus to display the electronic data sets. The method includes acquiring plural of the electronic data sets having unique document IDs attached, identifying a type of a document form for each of the plural electronic data sets, determining a weight value for each of the plural electronic data sets based on the identified type of the document form, generating printing image data by arranging the plural electronic data sets on a layout template having plural layout regions based on the weight value for each of the plural electronic data sets and attaching one unique identification information to the printing image data, generating a links page corresponding to the generated printing image data by embedding the unique document IDs of the plural electronic data sets arranged on as link information, transferring the generated links page and the one identification information item attached to the printing image data to the storage, and displaying one of the links pages retrieved from the storage corresponding to the identification information by reading the identification information printed on the printing medium.

Further, there is provided a computer-readable storage medium storing a program for causing a computer to execute the method for viewing a layout document according to an embodiment of the invention.

Note that any arbitrary combinations, expressions, or rearrangement, as appropriate, of the aforementioned constituting elements and so forth applied to a method, device, system, computer program, recording medium, and the like are all effective as and encompassed by the embodiments of the present invention.

Additional objects and advantages of the embodiments will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 6 is another schematic diagram illustrating the data structure of the document-form dictionary;

FIG. 7 is a schematic diagram illustrating a data structure of information on a layout template;

DETAILED DESCRIPTION OF THE PREFERRED EMBODIMENTS

Figure 1:
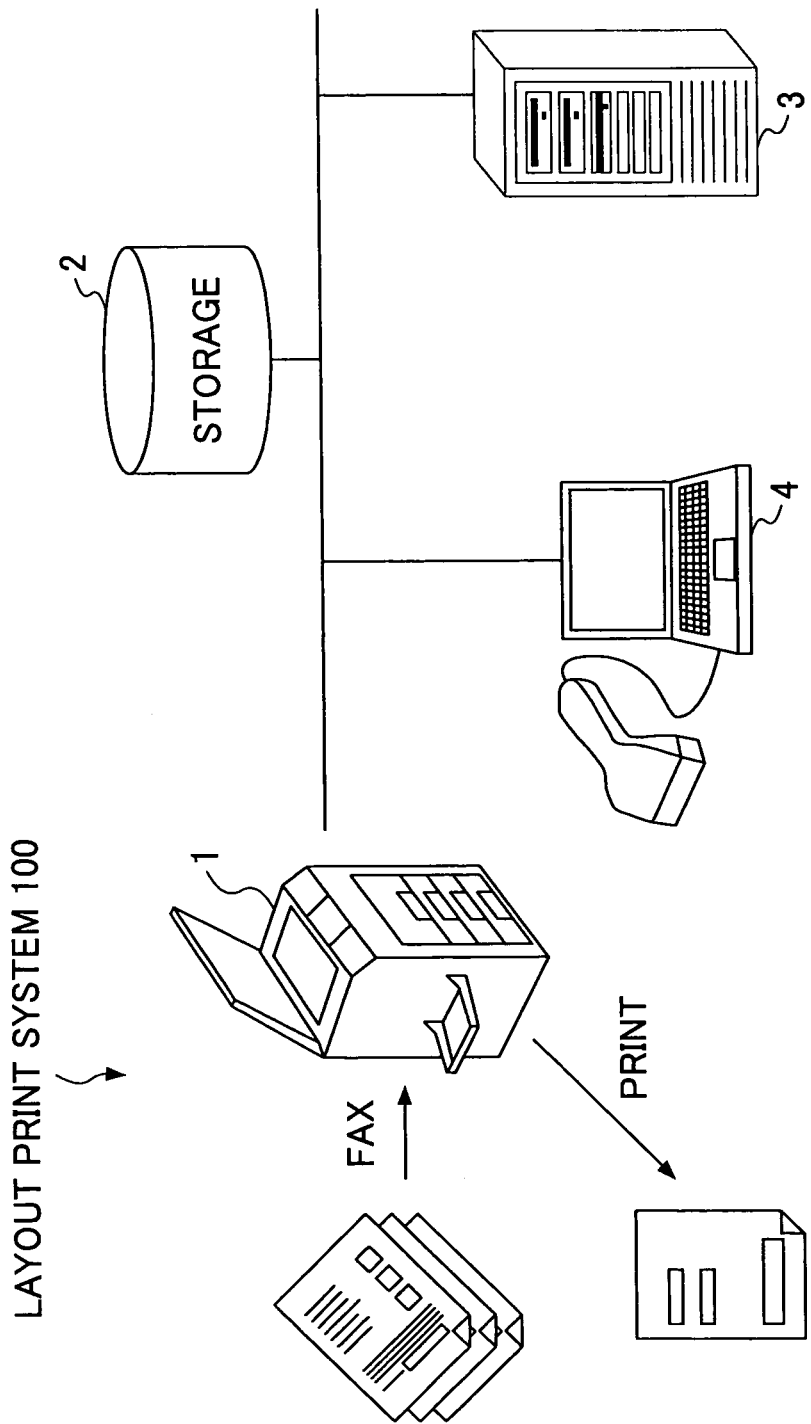
FIG. 1 is a network configuration diagram illustrating a layout print system according to an embodiment of the invention.

A description is given below, with reference to the FIGS. 1 through 17 of an embodiment and a modification of the present invention.
<System Configuration>
(Network)
A system configuration is first described prior to specific descriptions of the embodiment and modification. FIG. 1 is a network configuration diagram illustrating a layout print system 100 according to an embodiment of the invention. The layout print system 100 includes a multifunctional apparatus (printer) 1, a storage 2, an image generating server (printing image generating apparatus) 3, and a terminal (display) 4 that are mutually connected via a network 5.

The multifunctional apparatus 1 is a digital multifunctional apparatus or a so-called multifunction peripheral including facsimile (FAX) function, printer function, scanner function, and delivery function delivering such as input images. The multifunctional apparatus 1 according to the embodiment specifically receives FAX data and prints image data. The storage 2 stores (saves) electronic data (image data) received from the FAX function of the multifunctional apparatus 1. The image generating server 3 (also called as "image layout server") combines plural image data sets (FAX data) stored in the storage 2 on a layout template so as to facilitate viewing the combined image data to generate printing image data. The terminal (display) 4 is a user terminal including a display apparatus such as a personal computer (PC). The terminal 4 also includes a barcode reader as a peripheral. The network 5 may be either wired and wireless.

Note that the layout print system 100 is only one configuration example for the purpose of describing the embodiment, and a different apparatus such as the multifunctional apparatus 1 may instead include internal functions of the image generating server 3 and the storage 2.

The layout print system 100 can be implemented on the network. The outline of the layout print system 100 is as follows. The image generating server 3 acquires plural pages of document data (electronic data sets) and reduces sizes of the pages. The image generating server 3 then combines and arranges the reduced-in-size document pages onto one page or fewer than the number of pages originally received. Simultaneously, the image generating server 3 also provides the combined document page links to corresponding original documents. Printing image data generated by the image generating server 3 is printed by the multifunctional apparatus 1 as a printed document (combined printed document). Accordingly, a user can effectively carry out his/her tasks with the printed document. Note that if the user finds some of the page images on the combined printed document difficult to read or see, or desires to see some of the page images in further detail, the user scans a specified link of the desired page image with the barcode reader attached to the user terminal 4. When the user scans the link, the corresponding original document is displayed on a screen of the terminal 4. Thus, with the layout print system 100 according to the embodiment, the user can simply view the original document by tracing back from the combined document layout.

(HARDWARE)

A hardware configuration and a functional configuration of the image generating server (printing image generating apparatus) 3 are subsequently described below. However, descriptions of the multifunctional apparatus 1, storage 2, and terminal (display) 4 that are known to those skilled in the art are omitted.

Figure 2:
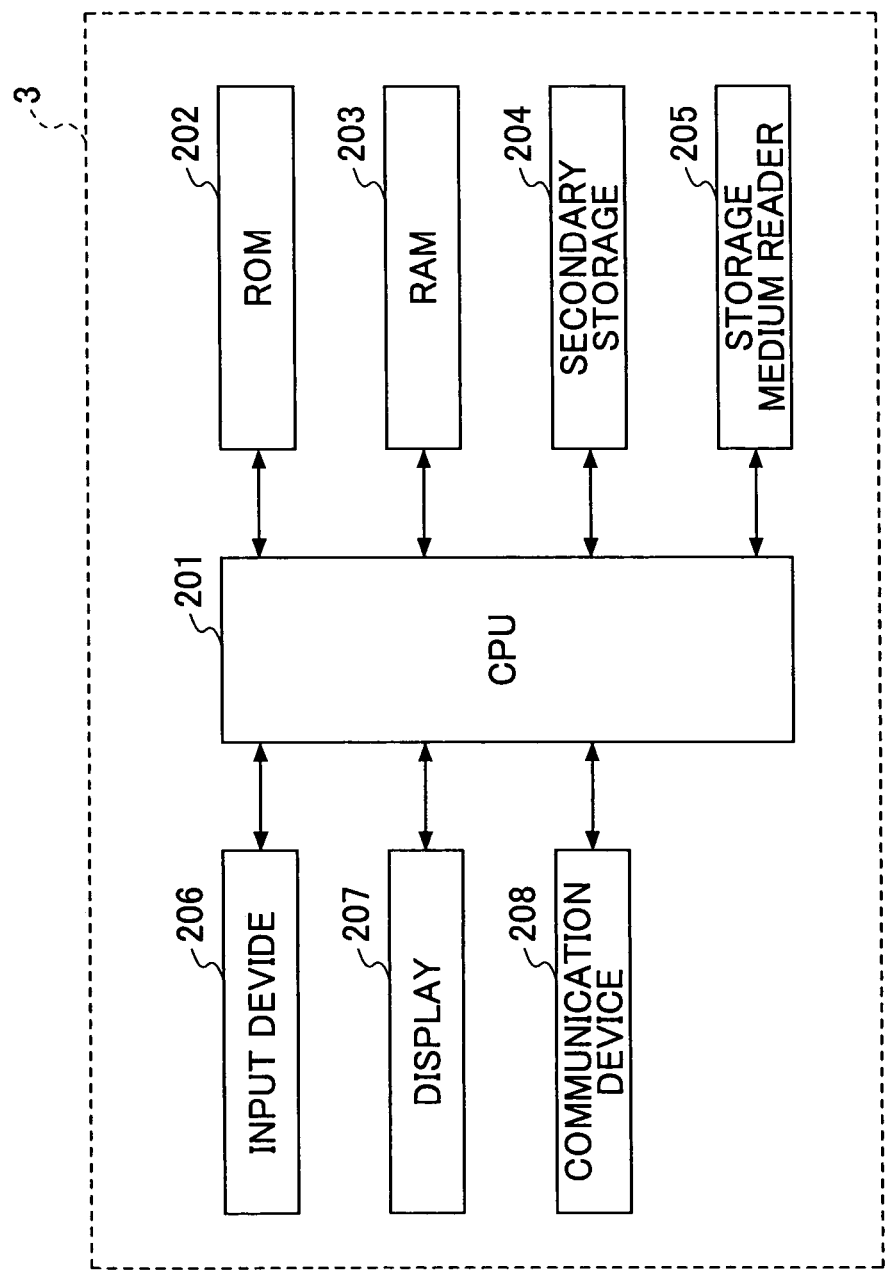
FIG. 2 is a hardware configuration diagram illustrating major components of an image generating server according to the embodiment of the invention.

FIG. 2 is a hardware configuration diagram illustrating major components of the image generating server 3 according to the embodiment of the invention. The image generating server 3 mainly includes a CPU 201, a read only memory (ROM) 202, a random access memory (RAM) 203, an secondary storage 204, a storage medium reading device 205, an input device 206, a display apparatus 207, and a communication device 208.

The CPU 201 is a circuit to control the entire image generating server and includes a microprocessor and peripheral circuits. The ROM 202 is a memory to store a predetermined control program (software component) executed by the CPU 201. The RAM 203 is utilized as a work area (work region), while the CPU 201 controls various kinds of processing by executing the predetermined control program (software component) stored in the ROM 202.

The secondary storage 204 is a hard disk drive (HDD) that stores various kinds of information including programs for a versatile operating system (OS) and the layout print system of the embodiment, a document-form dictionary, and a layout template. Note that the various kinds of information may be stored in other storage media such as a compact disk-ROM (CD-ROM) or a digital versatile disk (DVD) other than the secondary storage 204, which can be read via a driver such as the storage medium reading device 205. That is, various kinds of information may optionally be read by placing the storage media in the storage medium reading device 205.

The input device 206 is utilized for the user to conduct various input operations. The input device 206 includes a mouse, a keyboard, and touch panel switches superimposed on a screen of the display apparatus 207. The display apparatus 207 displays various data for project management, and may be a liquid crystal display (LCD), a cathode ray tube, and the like. The communication device 3 communicates with devices and apparatuses connected via the network 5, and supports their communications according to various suitable networks, such wired or wireless networks.

(Function)

Figure 3:
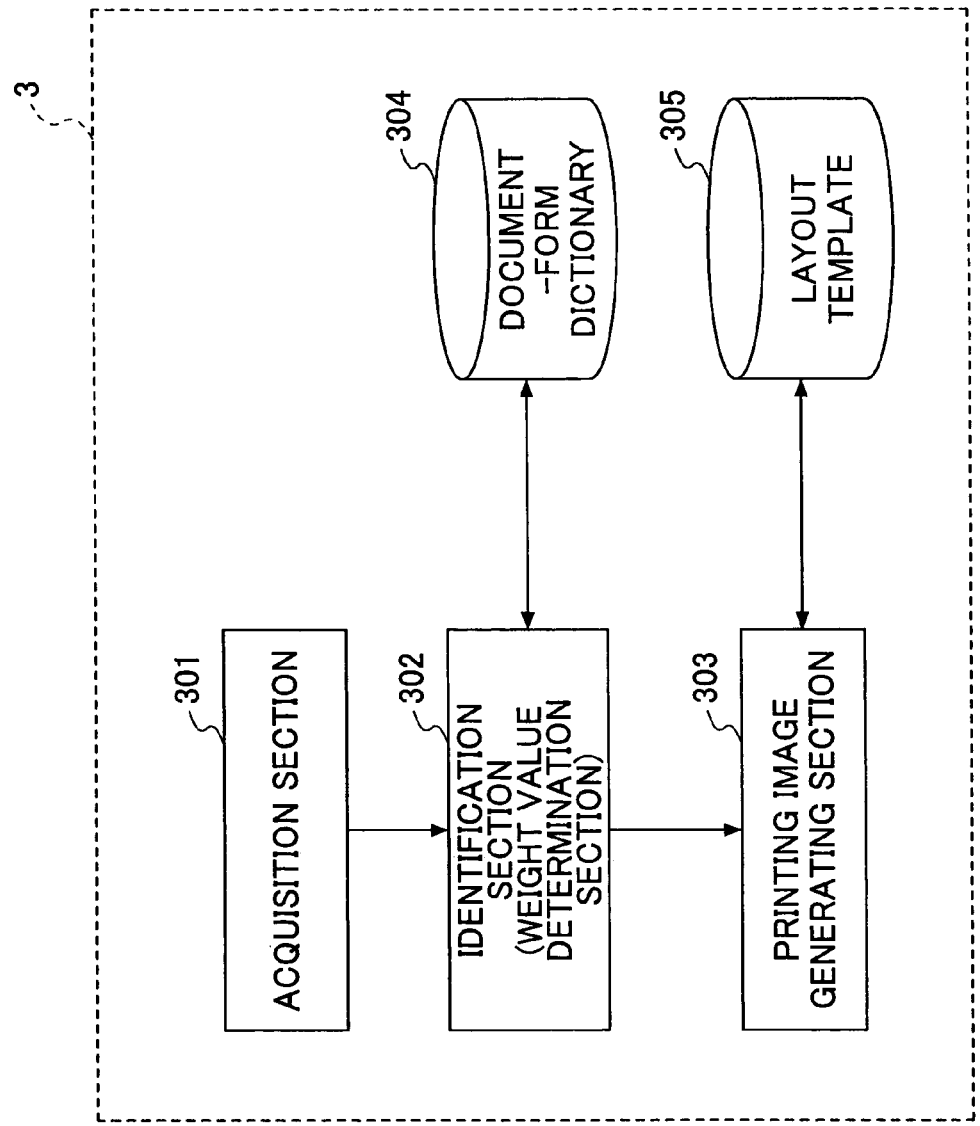
FIG. 3 is a functional block diagram illustrating major components of the image generating server according to the embodiment of the invention.

FIG. 3 is a functional block diagram illustrating major components of the image generating server 3 according to the embodiment of the invention. The image generating server 3 mainly includes an acquisition section 301, an identification section 302, and a printing image generating section 303. The image generating server 3 further includes a document-form dictionary 304 and a layout template 305.

The acquisition section 301 acquires the plural electronic data sets (page data) with the corresponding document IDs from the storage 2. In the layout system 100 according to the embodiment, the electronic data sets acquired corresponds to image data. The image data are received by a FAX function of the multifunctional apparatus 1 and stored in the storage 2. The data received by the FAX function are not limited to the image data, and may be any electronic data sets having such file formats including text data and line segment data (vector data) that can be utilized for the embodiment of the invention. The document IDs acquired by the acquisition section 301 are unique values attached to the corresponding electronic data sets.

The identification section 302 identifies types of document forms for the plural electronic data sets acquired by the acquisition section 301. The identification section 302 also determines a weight value of the electronic data sets based on the identified type of the document form (weight value determination section).

The identification section 302 refers to the document-form dictionary 304 to identify the type of the document form. The document-form dictionary 304 includes features of line segment intersections in document form image data registered by a feature extraction algorithm and the corresponding types of document forms. The identification section 302 executes feature extraction processing to extract a feature of the input electronic data sets (image data) and compares the feature with each of the features registered in the document-form dictionary 304. Thus, the type of the document form is specified based on the comparison result. The document-form dictionary 304 also includes weight values registered corresponding to the types of document forms. Thus, a weight value is determined based on the identified type of the document form. The size of the image data for a layout (reduced in size) is specified based on the weight value of the document form.

Alternatively, the identification section 302 may identify the type of the document form based on a character string. Specifically, the document-form dictionary 304 may include a registered data structure in which character strings are associated with the types of document forms. In this case, the identification section 302 identifies a type of the document form based on a character string acquired from each of the plural electronic data sets (by a character string acquisition section) obtained by the acquisition section 301. For example, if the electronic data set contains a character string "INVOICE", that electronic data set is more likely to be an invoice document form. Further, the character string "INVOICE" is generally printed in large characters located at a predetermined position (e.g., upper central position) of a document. This positional information may also be utilized for accurately identifying the type of document form based on the character strings. With this method, since the type of document form can be identified based on the character string actually contained in the electronic data sets, no feature extraction processing is required, thereby simplifying a program and improving processing rates of the program. However, the embodiment described below employs a case in which the type of document form is identified based on an extracted feature.

The printing image generating section 303 generates the printing image data by arranging the plural electronic data sets on the layout template having plural regions as page images based on the determined weight values of the electronic data sets while attaching identifiers (e.g., barcode) corresponding to the document IDs. The generated printing image data are printed on a printing medium such as paper by the multifunctional apparatus 1. The page images that are reduced in size are printed on the printing medium. The barcodes having the corresponding encoded document IDs are printed adjacent to the corresponding page images arranged on the layout template, and the electronic data set (image) corresponding to one of the document IDs is displayed on the screen of the terminal 4 upon scanning the corresponding barcode with the barcode reader of the terminal 4.

Note that the CPU 201 in practice executes the program to carry out processing of the acquisition section 301, the identification section 302, and the printing image generating section 303.

(Document-Form Dictionary)

Figure 4:
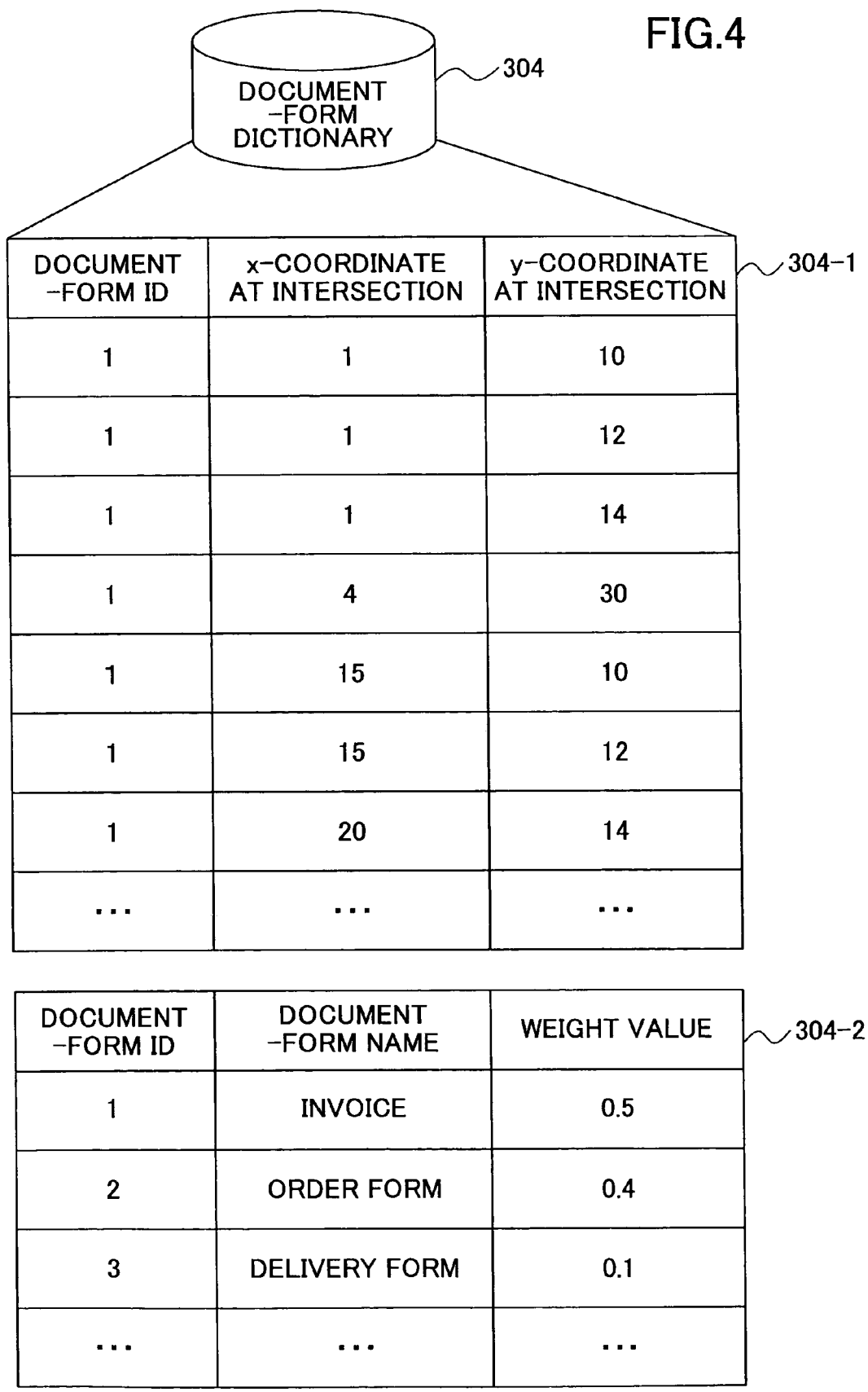
FIG. 4 is a schematic diagram illustrating a data structure of a document-form dictionary.

FIGS. 4 and 6 are schematic diagrams each illustrating data structure of the document-form dictionary 304. The document-form dictionary 304 is prepared in advance based on business formats, and includes, as shown in tables 304-1 and 304-2, document format IDs, features (coordinate information), names and weight values, and the like registered therein.

Figure 5:
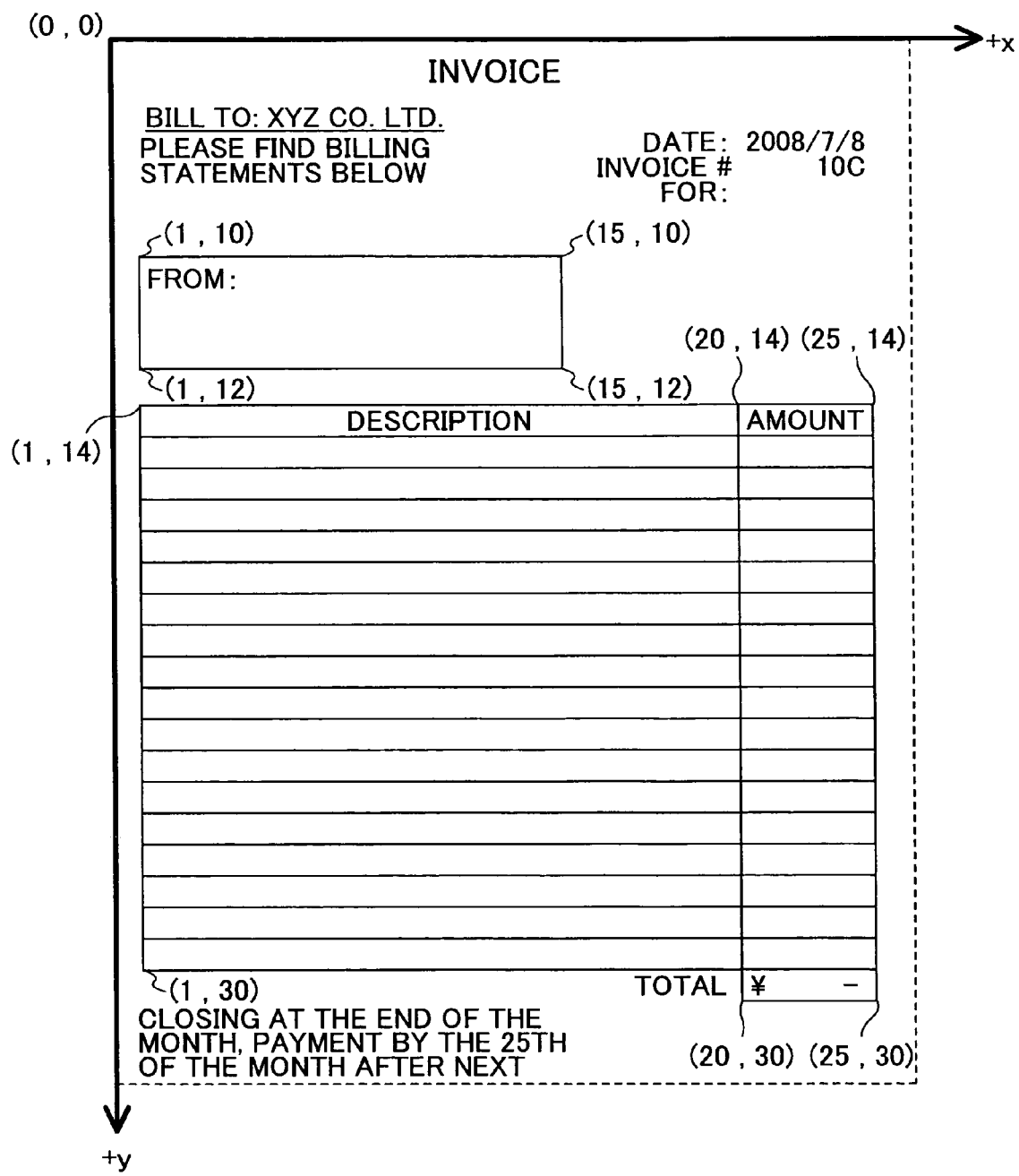
FIG. 5 is a view illustrating one type of a document form.

Referring to a table 304-1 of FIG. 4, a feature of line segment intersections in the document form are extracted by the feature extraction algorithm (related art). Specifically, for identifying a particular format of the document form, the line segment intersections depicted on the document form are computed, and computed intersections information items are extracted as a feature of the document form. The feature extraction processing is executed on the input electronic data sets (image data) to extract the feature thereof and compares the extracted feature with the features of the formats registered in the document-form dictionary 304. The type of the document form (format) is thus specified based on the obtained comparison result. This specific processing determines whether or not the extracted feature (feature value) is completely matched or approximately matched with any of the features of the document forms (formats) registered in the document-form dictionary 304, and either of those cases is determined as a matched case. That is, even though the extracted feature value is an approximate value or falls within an allowable range, that is, falls within a predetermined range of the extracted features including errors, such a case is also determined as the matched case. The allowable range does not exclude errors such as misalignment of intersections that may occur on scanning the electronic data sets. FIG. 5 is a view illustrating one example of a document form. The example shows the document form (format) that has the document form ID "1". The feature of the document form (format) having the document form ID of 1 has been extracted in advance and registered in the document-form dictionary 304. Note that if the electronic data are not image (pixel) data but line segment information (i.e., vector data), the feature extraction processing need not be conducted and hence the feature (intersections information) can be directly extracted from the vector data.

Referring to table 304-1 of FIG. 4, the weight value, which has been specified based on the type of the document form (document form ID) identified with the table 304-1, is registered in the table 304-2. The size of image data for a layout (reduced in size) is determined based on the weight value. The weight values may be specified by a user in advance. Greater weight values are assigned to the document formats such as an important document format or detailed document format that the user desires to arrange in large regions of the layout template.

Referring to FIG. 6, if the document format contains a predetermined character string (extracted by OCR or language analysis processing), the weight value is increased (decreased) based on a table 304-3 (character string dictionary). The electronic data may be flexibly arranged on the layout template not only by determining the type of the document form (document form ID) but also by varying the weight value with the character string contained in the document form. For example, if the electronic data contain a character string "URGENT", the document form of the electronic data sets implies an urgent document. In this case, the document form thereof will be arranged in a large region of the layout template, and hence the document form can be drawn greater attention among others on the printing medium. Alternatively, if the electronic data contain a character string "XX Trading Co.", the document form of the electronic data implies a document that is transferred from any of prominent customers. In this case, the document form will be arranged in a large region of the layout template, and hence the document form can be drawn greater attention among others on the printing medium. Thus, the document-form dictionary 304 is utilized for flexibly assigning a weigh value to the document form.

Further, a table 304-4 (cutout dictionary) includes a region (rectangular region information) utilized for cutting out a specific region of a specific form (ID) and arranging the cutout region as one page image on the layout template. For example, with the invoice of the document form ID1, a region where prices are printed is specifically important, so that the region is desired to be cut out and allocated in a large region of the layout template. The table 304-4 is particularly useful for such a case. The table 304-4 also contains information on whether the original intact document format, from which a certain region is cut out, is deleted or left as a one-page image. The cutout region is arranged as a one-page image on the layout template.

(Layout Template)

Figure 8:
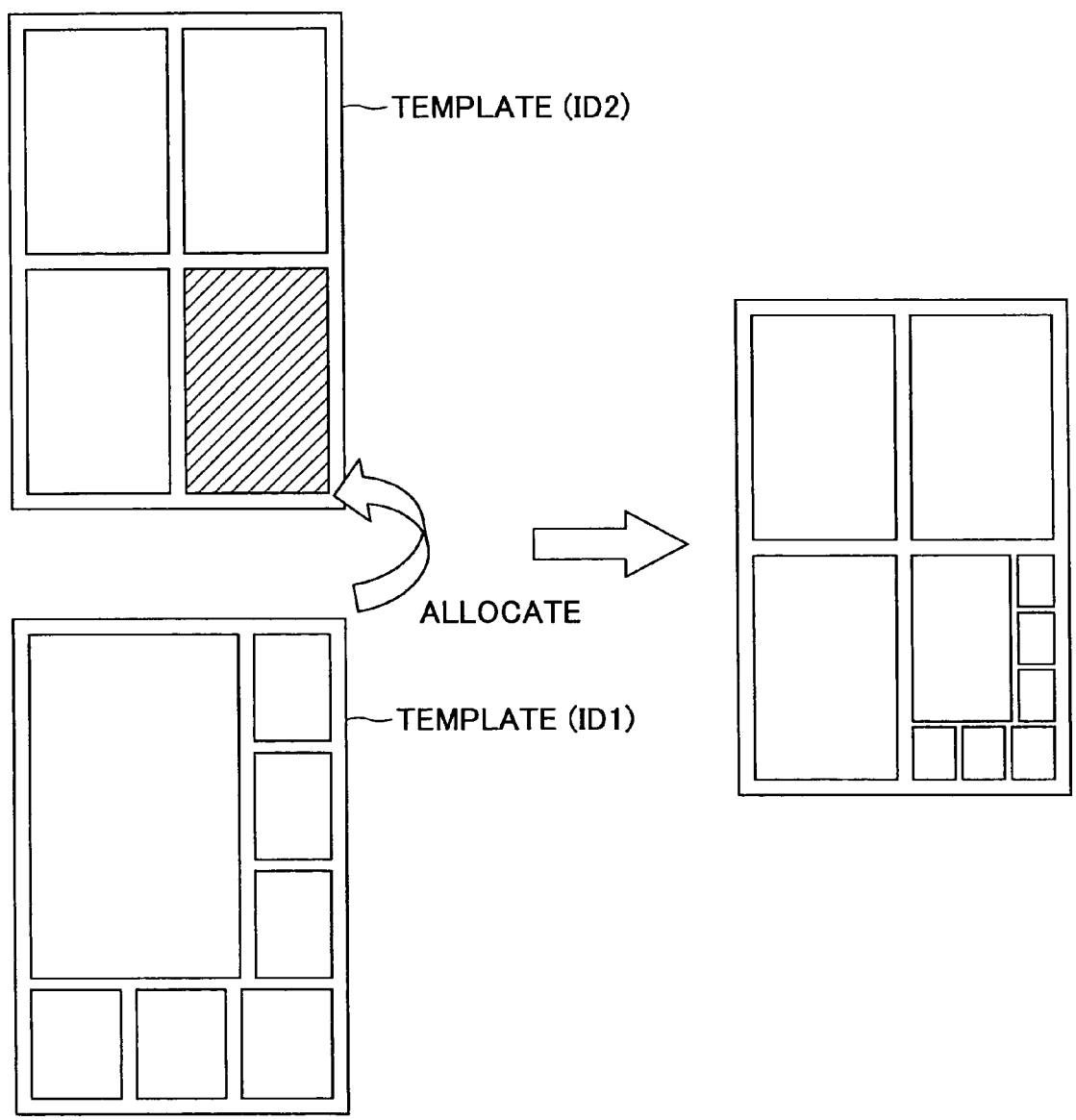
FIG. 8 is a diagram illustrating one example of a process in which a template is recursively arranged.

FIG. 7 is a schematic diagram illustrating a data structure of information on the layout template 305. The layout template 305 includes various registered templates, each of which includes definitions of coordinate information (ratio representation) for reducing sizes of the electronic data sets (page images) and arranging the reduced-size electronic data sets (page images). An optimal layout template is determined by comparing the weight value of the received electronic data sets (page images) with the coordinate information of the registered layout templates. Note that if the number of pages of the electronic data sets (page images) is greater than that of layout information (i.e., the number of rectangular regions of the layout template in which the electronic data sets can be arranged), the layout information (may differ from the original layout information) can be recursively allocated in the largest region. As a result, numerous page images can be arranged on the layout template. The coordinate information is defined by the ratio representation (%). The ratio representation is referred to as a notation system in which coordinates are specified by ratios. For example, the origin of a rectangular template is specified in advance and the coordinates are specified based on the ratio of an arbitrary point to an entire rectangular template. FIG. 8 is a diagram illustrating one example of a process in which a template is recursively arranged.

<Operation>
(First-Half Processing)

Figure 9:
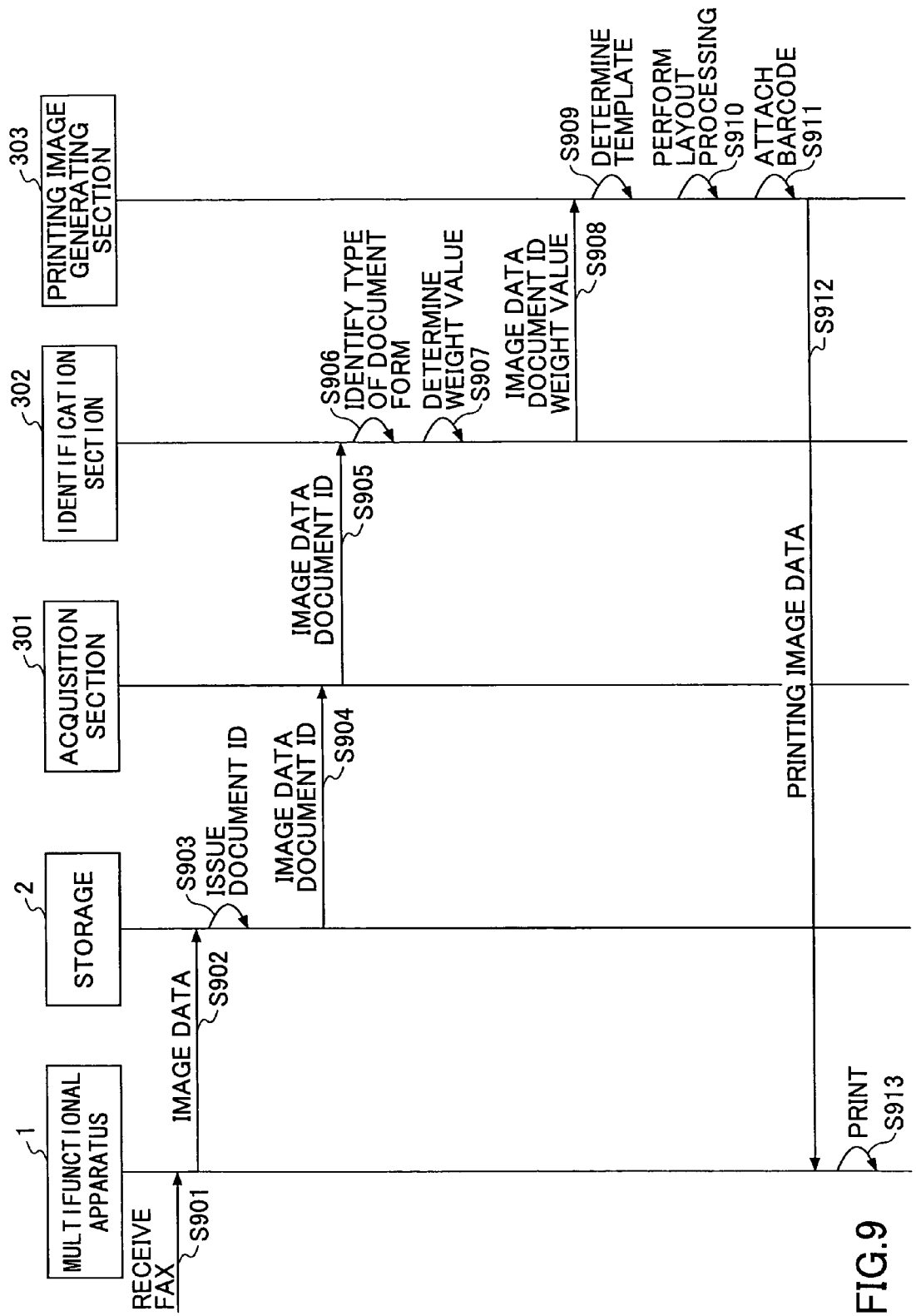
FIG. 9 is a sequence diagram of a first-half processing executed in the layout print system.

FIG. 9 is a sequence diagram in a first-half processing executed in the layout print system 100. In this processing, the image generating server 3 reduces sizes of plural image data sets (page images) received via FAX, and the reduced-in-size image data sets are combined and arranged onto one page or fewer than the number of pages of the image data originally received. Simultaneously, the reduced-in-size image data sets are provided with links to the corresponding original image data sets. The printing image data set generated by the image generating server 3 is printed as a printed document (combined document layout) by the multifunctional apparatus 1. The first-half processing is described below in further detail.

The multifunctional apparatus 1 receives plural pages of FAX image data at S901.

The image data hereinafter implies plural image data sets. The plural image data sets received are transferred to the storage 2 at step S902. The storage 2 issues unique document IDs and stores (saves) the received image data at step S903. The storage 2 then transfers the image data and the attached document IDs to the image generating server 3 (acquisition section 301) at step S904.

The acquisition section 301 acquires the image data and the attached document IDs and transfers them to the identification section 302 at step S905. The identification section 302 identifies a type of a document form for each of the image data sets at step S906. As described earlier, the feature extraction processing is executed on the image data to extract a feature (intersections information) and compares the feature with the features of the formats registered in the document-form dictionary 304 (304-1). One of the document form IDs is then specified based on the obtained comparison result. For example, suppose that a document form ID1, document form ID 2, document form ID 2, document form ID 3, document form ID 3, and document form ID 3 are specified for six pages of the image data (document IDs 0001-0006).

If the identified type of the document form (document form ID) is registered in the table 304-4 (cutout dictionary) in FIG. 6, for example, a rectangular region specified based on the rectangular region information is cut out of the document form (cutout section). For example, with the invoice of the document form ID1, a region where prices are printed is specifically important, so that the region is desired to be cut out and allocated in a large region of the layout template. The table 304-4 is particularly useful for such a case. The cutout region is arranged as one page image on the layout template.

Referring to FIG. 9, the identification section 302 (weight value determination section) determines a weight value by referring to the document-form dictionary 304 (304-2) at step S907. Note that the weight values are determined as follows:
(document form ID1, document form ID2, document form ID2, document form ID3, document form ID3, document form ID3)=(0.6, 0.4, 0.4, 0.1, 0.1, 0.1)

Since the image data identified as the document form ID1 contain a character string "XX Trading Co.", 0.1 (+0.1) is added to the weight value of the document form ID1 (0.5) to result in 0.6.

The image data (with the document IDs) and the corresponding weight values are transferred to the printing image generating section 303 at step S907. The printing image generating section 303 selects one of the layout templates contained in the layout template 305 at step S908. One of the layout templates is suitably selected based on the number of image data sets and the weight values specified. That is, a template having the number of regions close to the number of the image data sets received and the ratio of large display regions to small display regions approximating that of the image data sets received is selected. Referring back to FIG. 8, a template (ID1) is a layout template including seven rectangular regions. The template (ID1) includes one rectangular region with a (relatively) large size, three rectangular regions with medium sizes, and three rectangular regions with small sizes. As described above, the image data of six pages are input to the printing image generating section 303, and the weight values of the image data are as follows:
(document form ID1, document form ID2, document form ID2, document form ID3, document form ID3, document form ID3)=(0.6, 0.4, 0.4, 0.1, 0.1, 0.1)

Therefore, it is possible to classify the document forms of the image data into three groups based the specified weight values. These three groups correspond to one large-sized image, two medium-sized images, and three small-sized images. If no templates more suitable than the template ID1 having one large-sized rectangular region, two medium-sized regions and three small-sized regions are detected, the template ID1 is selected for the image data of six pages.

If the weight values of the image data are (document form ID1, document form ID2, document form ID3, document form ID3, document form ID4, document form ID5)=(0.6, 0.4, 0.1, 0.1, 0.5, 0.02), it is possible to classify the document forms of the image data into five groups based the specified weight values. However, if no optimal templates are detected, an allowable value (error value) of the following weight values may be set as plus/minus 0.1.

Thus, (document form ID3, document form ID4, document form ID5)=(0.1, 0.1, 0.5, 0.02) can be classified as the same group.

In this manner, the template (ID1) having one rectangular region with a (relatively) large size, three rectangular regions with medium sizes, and three rectangular regions with small sizes can be utilized for the image data including (document form ID1, document form ID2, document form ID3, document form ID3, document form ID4, document form ID5)= (0.6, 0.4, 0.1, 0.1, 0.5, 0.02).

If the number of image data sets (page images) is too many for the number of rectangular regions to be allocated in one template, the layout information can be recursively allocated in the largest region. As a result, numerous page images can be arranged on the layout template. For example, referring back to FIG. 8, if there are image data (page images) of 10 pages and the maximum number of regions the registered layout templates have is seven regions, image data of three pages will not be displayed on the template when allocating the image data of 10 pages to one of the registered templates without, modification. However, if the template ID1 is allocated in one of the largest rectangular regions of a template ID2, a layout template having 10 rectangular regions is generated.

Figure 10:
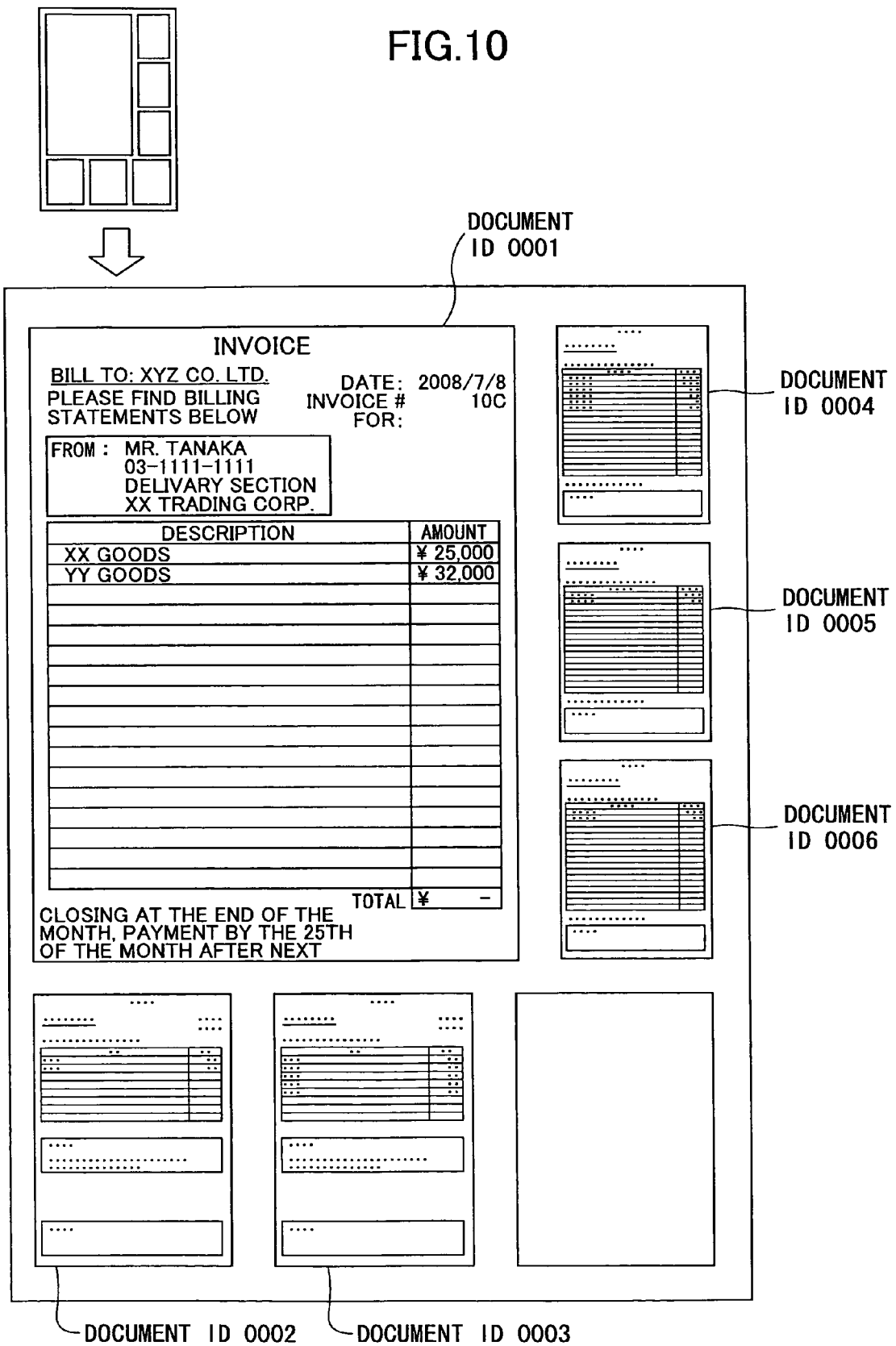
FIG. 10 is a view illustrating one example of a printing image including plural image data sets (page images) that are reduced in size to be arranged on a template ID1.

In FIG. 9, returning to step S910, the printing image generating section 303 selects (determines) the layout template and reduces individual sizes of the rectangular regions to allocate the image data sets (page images) therein. FIG. 10 is one example of the printing image including the plural image data sets (page images) that are reduced in size and arranged on a template ID1. FIG. 10 shows a view in which the image data (document ID 0001-0006) of six pages are combined as the page images in printing image data of one page.

Figure 11:
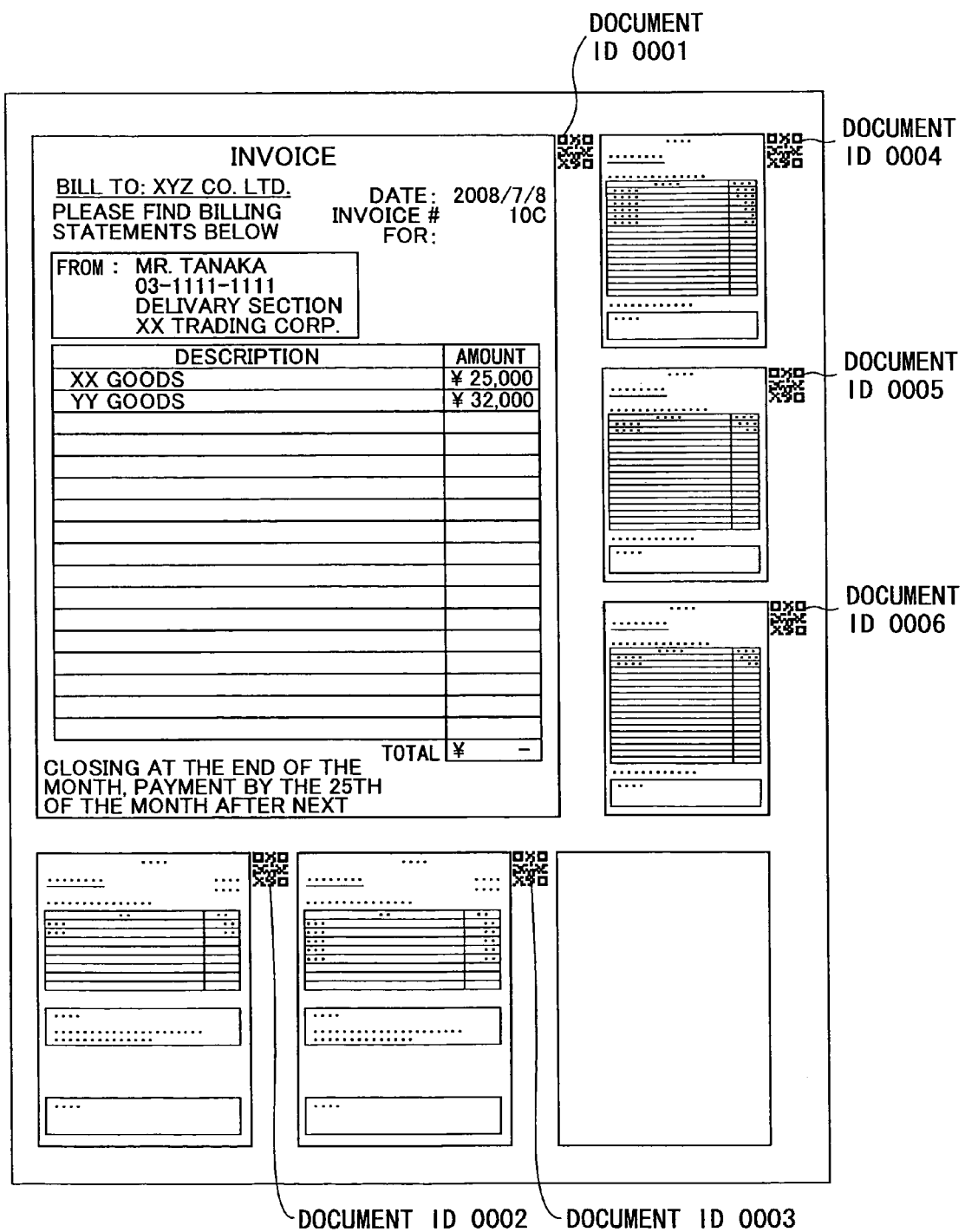
FIG. 11 is a view illustrating one example of the printing image including the plural image data sets (page images) to each of which a two-dimensional bar code is attached.

The printing image generating section 303 attaches the identification information (e.g., one-dimensional or two-dimensional barcode) of the encoded document IDs corresponding to the image data sets to spaces adjacent to the corresponding image data sets (page images) to generate the printing image data at step S911. The identification information is not limited to the barcode, and any kind of codes may be applied. FIG. 11 is one example of the printing image including the image data sets (page images) to each of which the two-dimensional bar code is attached. The use of barcode is described below in a second-half processing.

The printing image generating section 303 transfers the generated printing image data to the multifunctional apparatus 1 at step S912. The multifunctional apparatus 1 prints the printing image data on the printing medium (i.e., printed document) at step S913. FIG. 11 shows such a printed document. Although FIG. 11 illustrates one example of the aforementioned printing image data display apparatused on the screen, the display apparatused data may be directly printed on the printing medium.

(Second-Half Processing)

Figure 12:
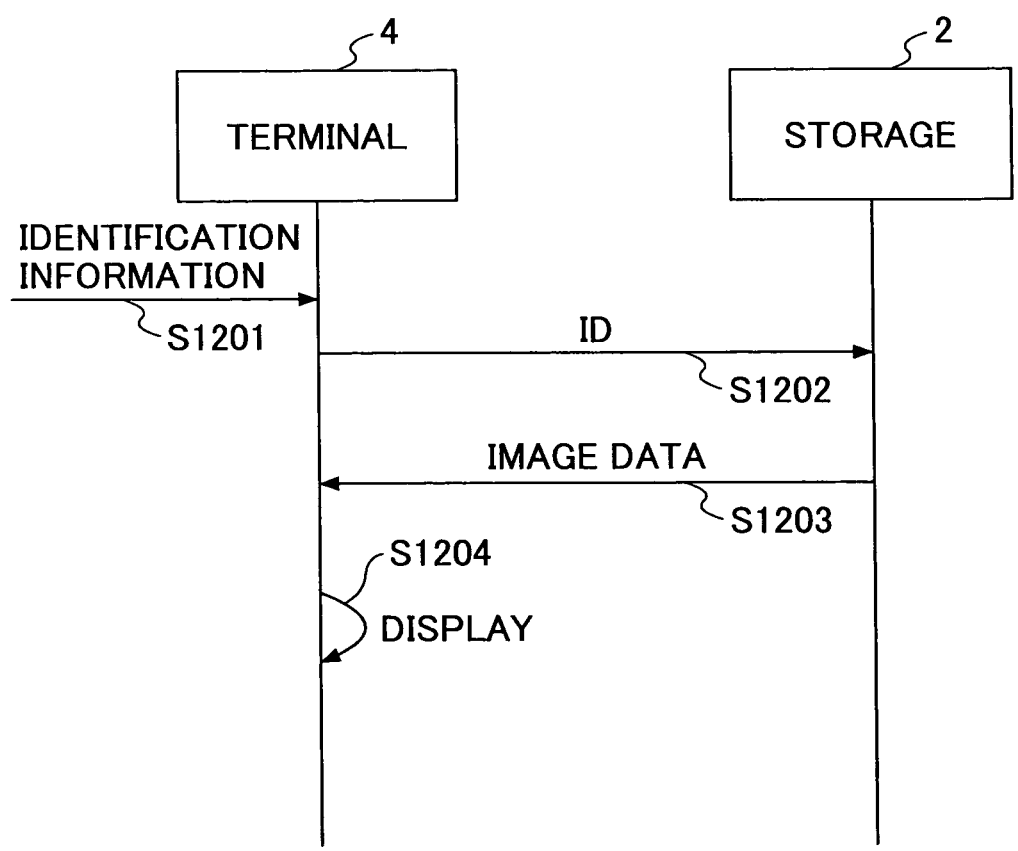
FIG. 12 is a sequence diagram of a second-half processing executed in the layout print system.

FIG. 12 is a sequence diagram in a second-half processing executed by the layout print system 100. In the second-half processing, the identification information is read by the barcode reader of the terminal 4 scanning a barcode. On scanning the barcode with the barcode reader, the original document of the image data is displayed. The second-half processing is described below in further detail.

The identification information (two-dimensional barcode) is scanned by the barcode reader attached the terminal 4 at step S1201. On scanning the barcode, the document ID of the corresponding page image is obtained. Referring to FIG. 11, the user selects any of the desired document forms (page images) to be displayed on the screen of the terminal 4 and scans the two-dimensional barcodes of the corresponding document forms on the printed document with the barcode reader. On scanning the barcodes, the document IDs (e.g., ID0004, the document at the upper-right position in FIG. 11) are obtained.

The terminal 4 transmits the document ID to the storage 2 and requests an acquisition of the image data corresponding to the document ID at step S1202.

The storage 2 that has stored the image data transfers the image data corresponding to a specific document ID to the terminal 4 at step S1203.

The terminal 4 displays image data received by a display apparatus of the terminal 4 at step S1204. Thus, the user can view the details (including enlarged view) of the desired document form on the screen of the display apparatus.

As described above, since the document data sets can be arranged and printed on one page or fewer than the number of pages originally received, work involving consumption of paper can effectively be conducted in the layout print system 100 according to the embodiment of the invention. If the user finds some of the page images on the printed document difficult to read or see, or desires to see a certain page image in detail, the user can scan the barcode of the page image supplied with the link to the original document, thereby simply viewing the original document. That is, the embodiment of the invention may provides the layout print system 100 in which the user can combined to arrange the plural documents on pages fewer than the number of pages originally received, and simply view the original document by tracing back from the combined document layout.

<Modification>

The layout print system 100 according to a modification is described below. Referring to FIG. 9, according to the embodiment, the identification information such as the two-dimensional barcode is attached to the spaces adjacent to the corresponding image data sets at step S911. However, if numerous image data sets subject to combination are received, there may be too many units of identification information to attach to the spaces. As a result, numerous units of the identification information may be printed on the document. This results in lowering the viewability of the document or work efficiency. According to a modification of the embodiment, only one unit of identification information is attached to the printed document while a links page (collection of links) is created and stored in the storage 2. On scanning the identification information, the links page is displayed on the screen of the terminal 4, and each of the page images contained in the links page can be displayed by clicking on them. Further details of the modification are described below.

(Function)

Figure 13:
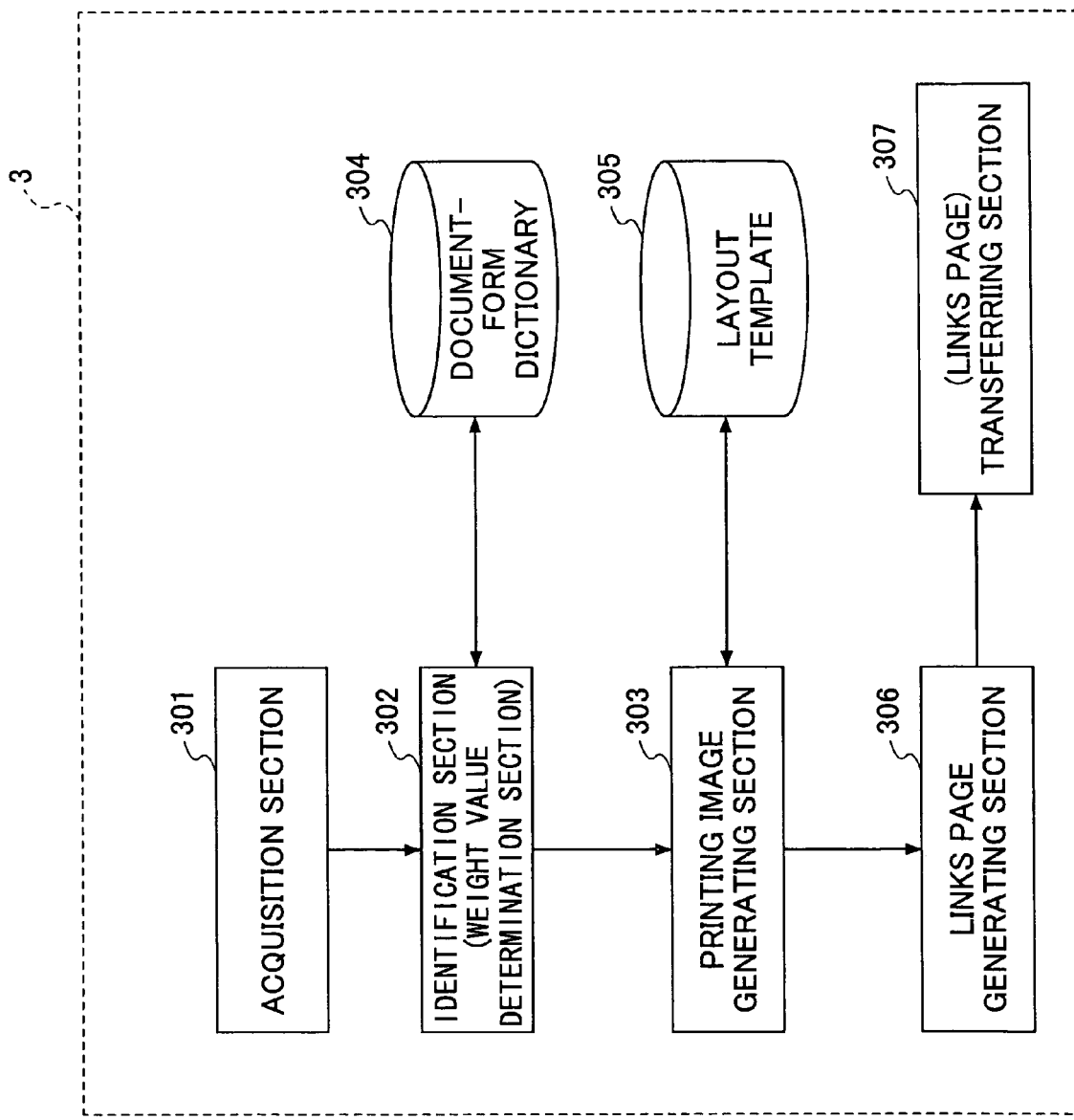
FIG. 13 is a functional block diagram illustrating major components of the image generating server according to a modification of the embodiment.

FIG. 13 is a functional block diagram illustrating major components of the image generating server 3 according to the modification. The image generating server 3 mainly includes the acquisition section 301, the identification section 302, the printing image generating section 303, a links page generating section 306, and a (links page) transfer section 307. The image generating server 3 further includes the document-form dictionary 304 and the layout template 305. The image generating server 3 according to the modification is configured to include the links page generating section 306 and the transfer section 307 in addition to the existing components of the image generating server 3 in FIG. 3. The image generating server 3 according to the modification is described in detail below except for the acquisition section 301 and the identification section 302 that have already been described above.

Figure 14:
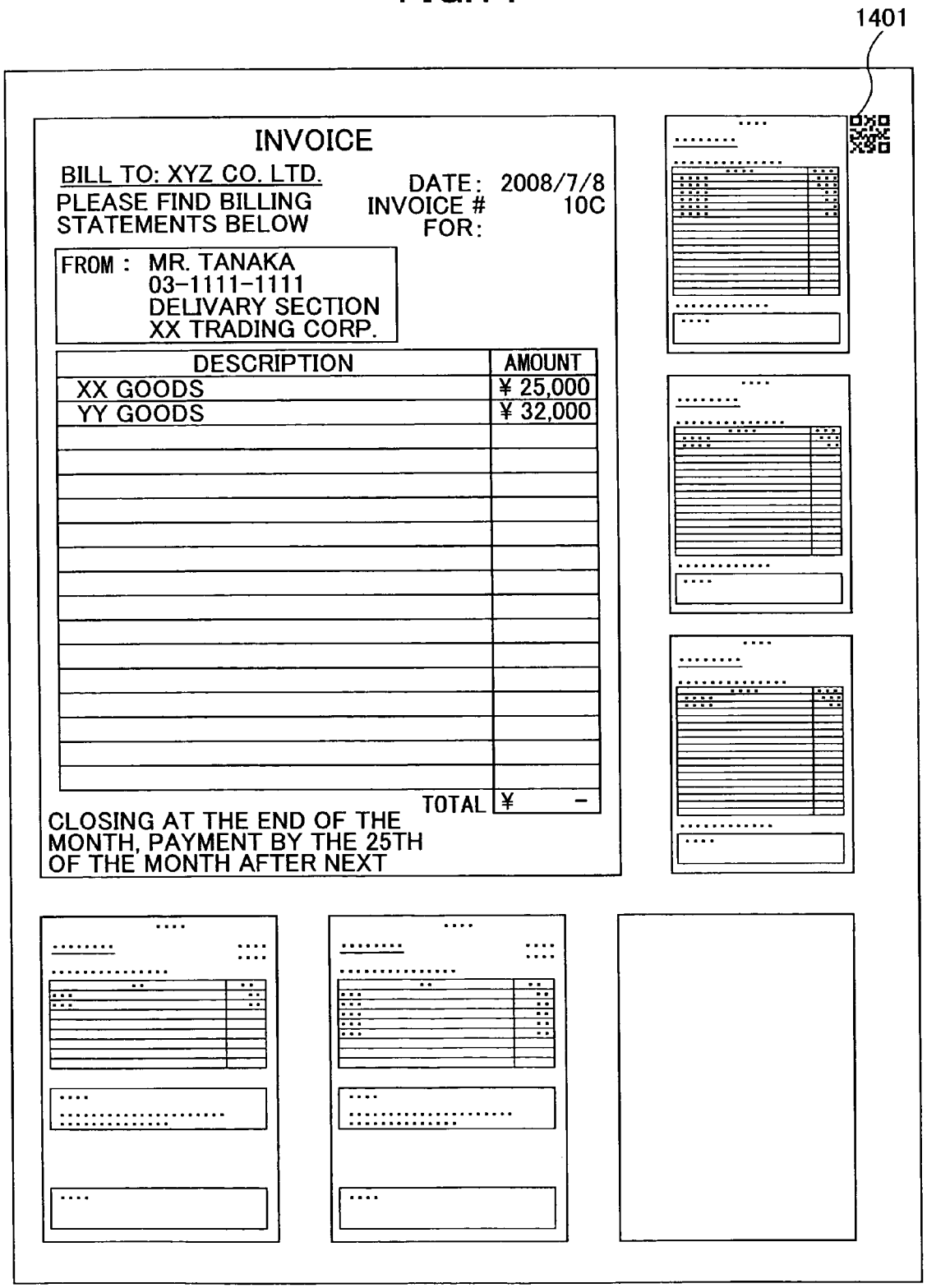
FIG. 14 is a view illustrating one example of printing image data generated by a printing image generating section according to the modification.

The printing image generating section 303 generally generates printing image data as described above. However, in the printing image generating section 303 of the modification, the identification information such as the two-dimensional barcode is not attached to the spaces adjacent to the image data sets. Instead, the printing image generating section 303 of the modification generates printing image data including one unit of unique identification information with encoded links page IDs. FIG. 14 is a diagram illustrating one example of such printing image data generated by the printing image generating section 303 according to the modification. As depicted, one unit of identification information 1401 is attached to the printing image data.

Figure 15:
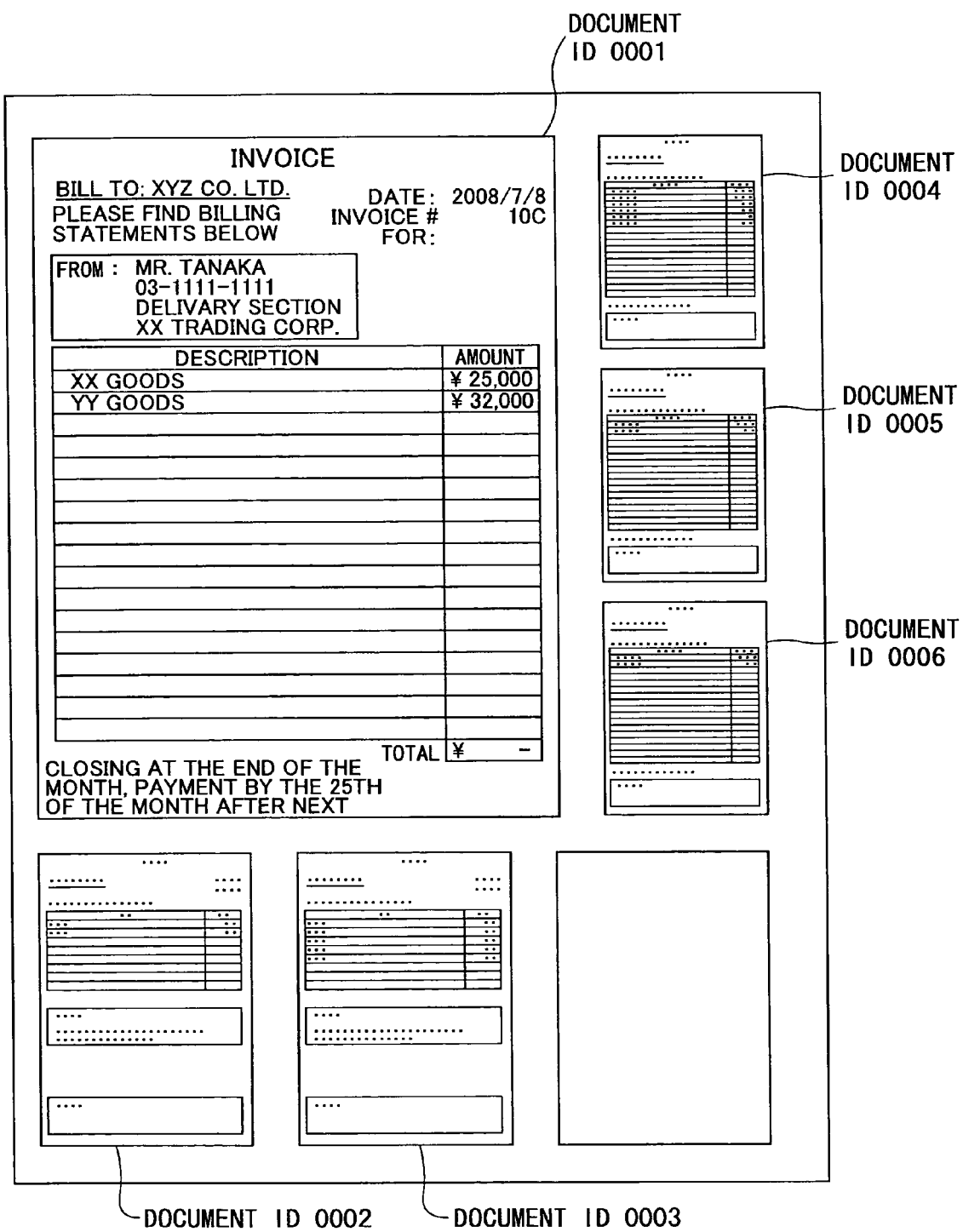
FIG. 15 is a view illustrating one example of a links page corresponding to the printing image data.

The links page generating section 306 generates a links page corresponding to the printing image data generated by the printing image generating section 303. The links page generating section 306 generates the links page by embedding the document IDs of the image data sets in the image data sets (page images) as link information. FIG. 15 is a diagram illustrating one example of the links page corresponding to the print image data. In appearance, the links page looks similar to the printing image data; however, the document IDs corresponding to the image data sets are embedded in the image data region (page image) as the link information. Specifically, the links page includes addresses to designate locations of the image data sets stored in the storage 2 as link destinations. The identification information 1401 is not provided to the links page. The links page transfer section 307 transfers the links page with the links page IDs generated by the links page generating section 306. The storage 2 stores the received links page with the links page IDs.

<Operation>

Figure 16:
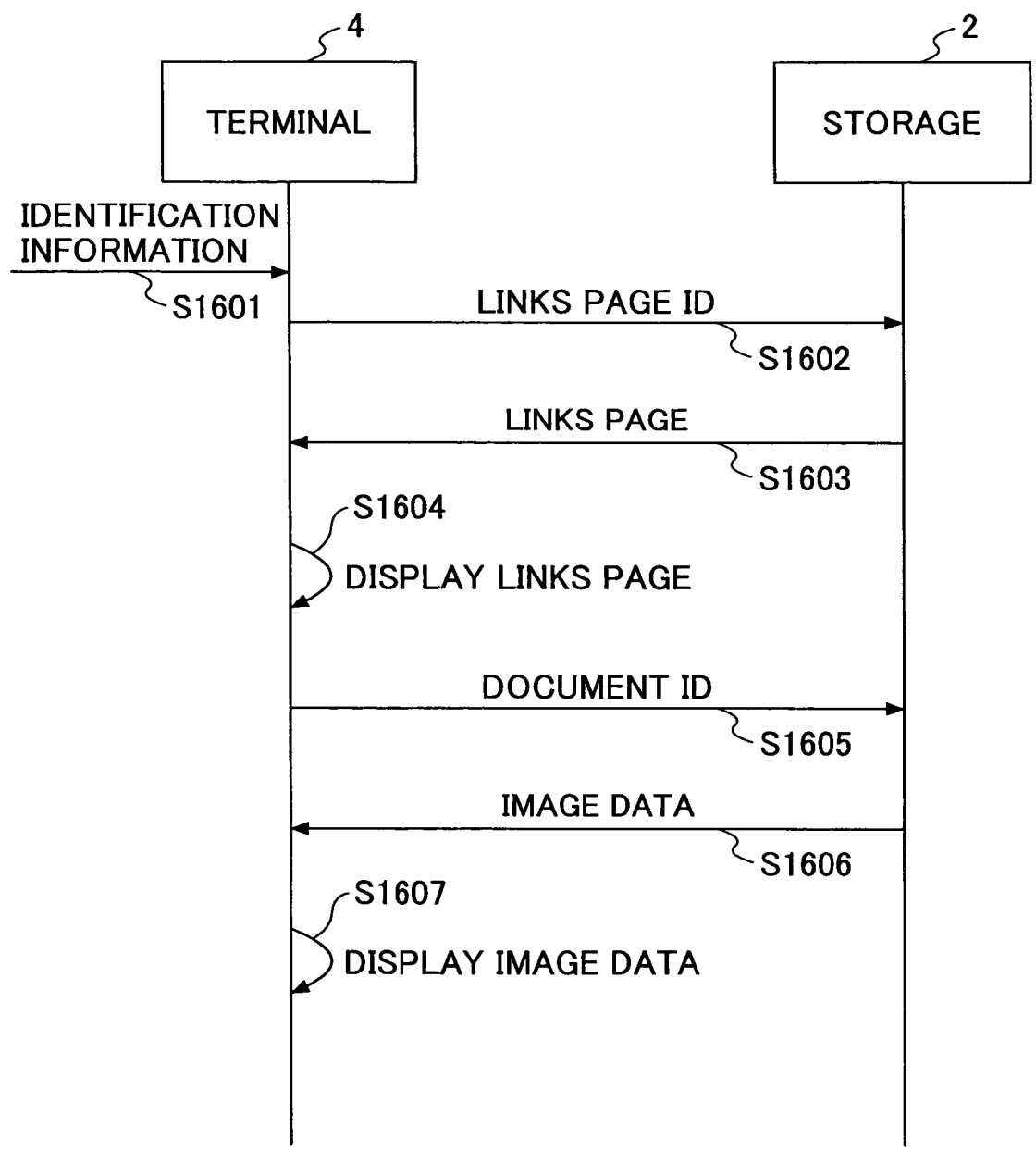
FIG. 16 is a sequence diagram of a second-half processing executed in the layout print system according to the modification.

FIG. 16 is a sequence diagram in the second-half processing executed in the layout print system 100 according to the modification. In the second-half processing, the identification information is read by the barcode reader of the terminal 4 scanning a barcode. On scanning the barcode on the printed document, the links page is displayed on the screen of the terminal 4. The second-half processing is described below in further detail.

The identification information (two-dimensional barcode) that has encoded the links page ID is scanned by the barcode reader attached the terminal 4 at step S1601. On scanning the barcode, the links page ID of the corresponding links page is obtained. For example, referring to FIG. 14, the user scans the two dimensional barcode 1401 provided on the printed document with the barcode reader. On scanning the barcode, one of the links page IDs is obtained from the scanned barcode.

The terminal 4 transmits the links page ID to the storage 2 and requests an acquisition of the links page corresponding to the links page ID at step S1602.

The storage 2 that has stored the links pages transfers the links page (data) corresponding to a specific links page ID at step S1603.

The terminal 4 displays the received links page data on the screen of the terminal 4 at step S1604. The user then clicks on a desired document form region displayed on the screen.

The terminal 4 transfers the links page ID to the storage 2 and requests an acquisition of the image data corresponding to the document ID at step S1605.

The storage 2 that has stored the image data transfers the image data corresponding to a specific document ID at step S1606.

The terminal 4 displays the received image data on the screen of the terminal 4 at step S1607. Thus, the user can view the details (including enlarged view) of the desired document form on the screen.

Figure 17:
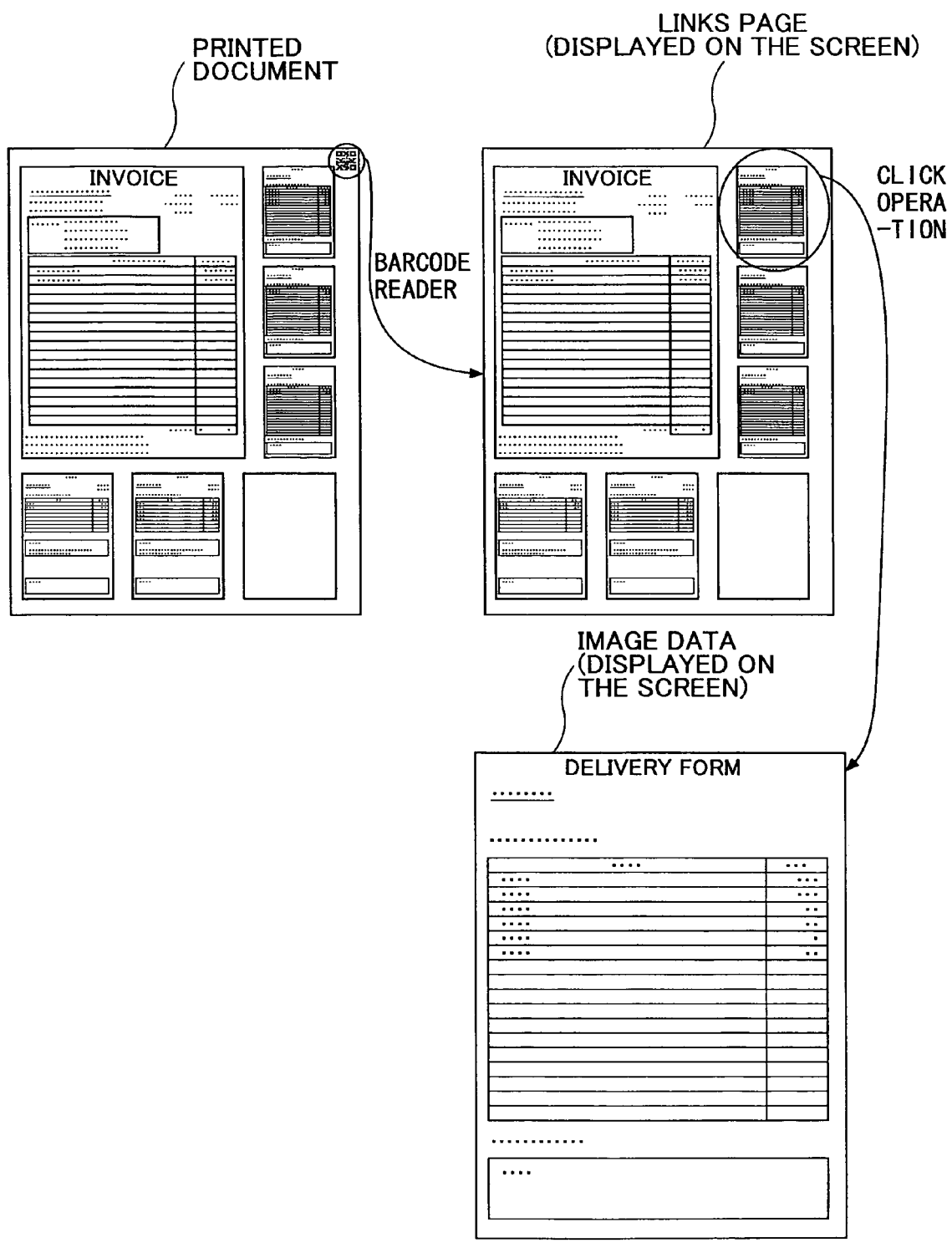
FIG. 17 is a view illustrating one example of a relationship between a printed document, the links page and the image data.

FIG. 17 is a view illustrating one example of a relationship between a printed document, the links page and the image data.

Note that, as described above, the identification section 302 determines a weight value of the electronic data sets based on the identified type of the document form (weight value determination section). In this state, a predetermined threshold may be set for the weight values of the electronic data sets in advance, and the printing generating section 303 may exclude the electronic data sets a weight value less than the threshold from the printing image data. If there are plural electronic data sets each having a weight value that is less than the threshold, those electronic data sets may not be so important. However, irrespective of this, if the identification section 302 generates the printing image data including those unimportant electronic data sets, the viewability of the printing image data may be lowered. Therefore, according to this modification, the electronic data sets having the weight values that are less than the threshold are not be included in the printing image data. Instead, some comment such as "there are three additional data sets not displayed" may be displayed in a space of the printing image data sets. The additional three data sets imply data having the weight values that are less than the threshold. The links page generating section 306 creates links from the comment display "there are three additional data sets not displayed" to original documents corresponding to the additional three data sets. In this case, when the printing image data are printed on paper by the multifunctional apparatus 1 as a printed document (combined document layout), the documents of the electronic data sets having the weight values less than the threshold are not printed on paper. In this manner, the viewability of the printing image data sets can be improved especially when numerous electronic data sets are received. If the user desires to read or see the page image (additional three data sets) in further detail, the user scans a barcode including the links with the barcode reader of the terminal 4. On scanning the links, the links page of the three additional data sets is displayed on the screen of the display apparatus of the terminal 4, and the user can trace back to the original documents of the three from the links in the links page.

As described above, since the document data sets (electronic data sets) can be arranged and printed on one page or fewer than the number of pages originally received, work involving consumption of paper can be efficiently conducted in the layout print system 100 according to the modification of the embodiment. If the user finds some of the page images on the printed document difficult to read or see, or desires to see a certain page image in detail, the user can scan the barcode attached to the page image supplied with the link to the original document, thereby simply viewing the original document (via the links page). Further, according to the modification, since only one unit of identification information is attached to the printed document, the viewability of the printed document can be improved, which results in improving work efficiency.

According to the embodiments of the invention, there are provided the layout print system, the method for viewing the layout document and the program product for causing a computer to execute the method for viewing the layout document, in which the user can cause documents to combined to arrange plural of the documents on pages fewer than the number of pages of the documents originally received, and simply view the original documents by tracing back from the combined document layout.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

This patent application is based on Japanese Priority Patent Application No. 2008-204624 filed on Aug. 7, 2008, the entire contents of which are hereby incorporated herein by reference.

What is claimed is:

1. A layout print system, comprising:
a storage configured to store a plurality of electronic data sets representing pages of image data, each electronic data set having its own unique document IDs attached thereto;
a printing image generating apparatus configured to generate printing image data based on the stored electronic data sets, and including
an acquisition section configured to acquire the plural electronic data sets with the unique document IDs attached thereto from the storage, an identification section configured to identify a type of a document form for each of the plural electronic data sets acquired by the acquisition section, a weight value determination section configured to determine a weight value for each of the plural electronic data sets based on the identified type of the document form identified by the identification section, and a printing image generating section configured to generate the printing image data by arranging the plural electronic data sets on a layout template having a plurality of layout regions based on the weight value for each of the plural electronic data sets determined by the weight value determination section, reduce individual sizes of the plural electronic data sets, respectively, based on the layout template and attaching identification information adjacent to each of the plural electronic data sets arranged on the layout template, each identification information corresponding to the unique document ID of each electronic data set;

a printer configured to print the printing image data generated by the printing image generating section; and a display apparatus including an information identification reader provided thereto to read the identification information printed on a printing medium, and configured to display a desired one of the electronic data sets by carrying out identification processing based on the identification information, wherein the printing image generating apparatus includes, a character-string dictionary including registered character strings extracted by at least one of optical character recognition (OCR) and language analysis processing, the character-string dictionary also including weight values associated with the registered character strings, and the weight value determination section increments a weight value associated with a first character string contained in one of the electronic data sets, when the first character string is matched with one of the registered character strings.

2. The layout print system as claimed in claim 1, wherein the identification information includes a plurality of identification codes corresponding to the document IDs, and wherein the identification processing includes identifying the desired one of the electronic data sets based on a corresponding one of identification codes that is selected on the printing medium by the information identification reader.

3. The layout print system as claimed in claim 1, wherein the printing image generating apparatus further includes a links page generation section configured to generate a links page corresponding to the printing image data generated by the printing image generating section by embedding the document IDs of the plural electronic data sets as link information, and a transfer section configured to transfer the links page generated by the links page generation section and the identification information attached to the printing image data generated by the printing image generating section to the storage, wherein the identification information includes one unique ID identifying the links page, and wherein the identification processing includes retrieving the links page from the storage corresponding to the one unique ID read by the identification reader, displaying the links page retrieved from the storage and causing the desired one of the electronic data sets to be selected on the links page.

4. The layout print system as claimed in claim 1, wherein the printing image generating apparatus includes a document-form dictionary including registered types of document forms and features of line segment intersections contained in the types of document forms associated therewith, and wherein the identification section is configured to extract the line segment intersections as a feature thereof from one of the plural electronic data sets acquired by the acquisition section and identify a type of a document form of one of the plural electronic data sets based on the extracted feature matched with one of the features registered in the document-form dictionary.

5. The layout print system as claimed in claim 1, wherein the printing image generating apparatus includes a document-form dictionary including registered types of document forms and character strings associated therewith, and a character string acquisition section configured to acquire a character string from each of the plural electronic data sets acquired by the acquisition section, and wherein the identification section is configured to identify a type of a document form of one of the plural electronic data sets based on the acquired character string matched with one of the character strings registered in the document-form dictionary.

6. The layout print system as claimed in claim 1, wherein the printing image generating apparatus includes a cutout dictionary including registered types of document forms and rectangular region information associated therewith, the rectangular region information including cutout regions removed from the electronic data sets, and a cutout section configured to cut out, when the type of the document form identified by the identification section is matched with one of the types of document forms registered in the cutout dictionary, a rectangular region from the electronic data set having the identified type of the document form based on the rectangular region information associated with the identified type of the document form, and wherein the rectangular region information including the cutout rectangular regions cut out by the cutout section is added as one electronic data set to the plurality of the electronic data sets.

7. The layout print system as claimed in claim 1, wherein the identification information is one of a one-dimensional barcode and a two-dimensional barcode.

8. The layout print system as claimed in claim 1, wherein the layout template includes ratio information including a proportion of coordinate information on a layout to that of an entire layout template.

9. A method for viewing a layout document in a layout system, the method comprising:

retrieving a plurality of electronic data sets representing pages of image data, each electronic data set having its own unique document IDs attached thereto;

identifying a type of a document form for each of the acquired plural electronic data sets;

determining a weight value for each of the acquired plural electronic data sets based on the identified type of the document form;

generating printing image data by reducing individual sizes of each of the plural electronic data sets, arranging the plural electronic data sets on a layout template having a plurality of layout regions based on the weight value for each of the plural electronic data sets and attaching identification information adjacent to each of the plural electronic data sets arranged on the layout template, each identification information corresponding to the unique document ID of each electronic data set;

printing the printing image data with the identification information on a printing medium; and displaying one of the retrieved electronic data sets corresponding to the identification information obtained by reading the identification information printed on the printing medium, wherein the generating printing image data further includes, storing a character-string dictionary including registered character strings extracted by at least one of optical character recognition (OCR) and language analysis processing, the character-string dictionary also including weight values associated with the registered character strings, and the determining the weight value further includes, incrementing a weight value associated with a first character string contained in one of the electronic data sets, when the first character string is matched with one of the registered character strings.

10. A method for viewing a layout document in a layout system, the method comprising:

acquiring a plurality of electronic data sets representing pages of image data, each electronic data set having its own unique document IDs attached thereto;

identifying a type of a document form for each of the plural electronic data sets;

determining a weight value for each of the plural electronic data sets based on the identified type of the document form;

generating printing image data by arranging the plural electronic data sets on a layout template having a plurality of layout regions based on the weight value for each of the plural electronic data sets, reducing individual sizes of the plural electronic data sets, respectively, based on the layout template and attaching one unique identification information to the printing image data;

printing the printing image data and one unique identification information on a printing medium;

generating a links page corresponding to the generated printing image data by embedding the unique document IDs of the plural electronic data sets arranged thereon with the unique document IDs being link information, the one unique identification information identifying the links page;

transferring the generated links page to a storage; and displaying the links page retrieved from the storage corresponding to the identification information by reading the identification information printed on the printing medium, wherein the generating printing image data further includes, storing a character-string dictionary including registered character strings extracted by at least one of optical character recognition (OCR) and language analysis processing, the character-string dictionary also including weight values associated with the registered character strings, and the determining the weight value further includes, incrementing a weight value associated with a first character string contained in one of the electronic data sets, when the first character string is matched with one of the registered character strings.

11. A non-transitory computer-readable storage medium storing a program for causing a computer to execute the method for viewing a layout document as claimed in claim 9.

12. The layout print system as claimed in claim 1, wherein the reduced individual size of each of the plural electronic data sets is based on the corresponding weight value.

13. The layout print system as claimed in claim 1, wherein the identification information is adjacent to the layout region associated with the corresponding electronic data set.

14. The method as claimed in claim 9, wherein the identification information is adjacent to the layout region associated with the corresponding electronic data set.

15. The method as claimed in claim 10, wherein the reduced individual size of each of the plural electronic data sets is based on the corresponding weight value.

16. The method as claimed in claim 10, wherein the identification information is adjacent to the layout region associated with the corresponding electronic data set.

* * * * *